(12) United States Patent
Crawford et al.

(10) Patent No.: US 10,760,462 B2
(45) Date of Patent: Sep. 1, 2020

(54) APPARATUS AND METHOD FOR GASEOUS EMISSIONS TREATMENT USING INDUCTION HEATING WITH MOVABLE HEAT PROFILE

(71) Applicant: Advanced Technology Emission Solutions Inc., Toronto (CA)

(72) Inventors: Robin Crawford, Carlisle (CA); John Douglas, Brantford (CA)

(73) Assignee: ADVANCED TECHNOLOGY EMISSION SOLUTIONS INC., Toronto, Ontario (CA)

( * ) Notice: Subject to any disclaimer, the term of this patent is extended or adjusted under 35 U.S.C. 154(b) by 65 days.

(21) Appl. No.: 16/113,699

(22) Filed: Aug. 27, 2018

(65) Prior Publication Data

US 2019/0003363 A1    Jan. 3, 2019

Related U.S. Application Data

(63) Continuation-in-part of application No. 15/819,324, filed on Nov. 21, 2017, now Pat. No. 10,590,818, and
(Continued)

(51) Int. Cl.
*F01N 3/20* (2006.01)
*B01D 53/94* (2006.01)
(Continued)

(52) U.S. Cl.
CPC ........... *F01N 3/2026* (2013.01); *B01D 53/92* (2013.01); *B01D 53/94* (2013.01);
(Continued)

(58) Field of Classification Search
CPC ..... Y02T 10/26; F01N 3/2013; F01N 3/2026; F01N 9/00; F01N 2550/22; F01N 3/0892;
(Continued)

(56) References Cited

U.S. PATENT DOCUMENTS

| 4,505,726 A | * | 3/1985 | Takeuchi | ........... B01D 46/2407 |
| | | | | 422/174 |
| 2007/0068933 A1 | * | 3/2007 | Wilkes | ....................... B01J 8/40 |
| | | | | 219/633 |

(Continued)

*Primary Examiner* — Anthony Ayala Delgado
(74) *Attorney, Agent, or Firm* — Stuart L. Wilkinson (57) ABSTRACT

An assembly for treating gaseous emissions has a substrate with cells for the passage of an emissions gas to be treated and inductive heating elements located in some of the cells. An electromagnetic field generator mounted near the substrate generates a varying electromagnetic field, so as to inductively heat the inductive heating elements and so heat the substrate. Some of the inductive heating elements have a first natural resonant frequency other inductive elements have a second natural resonant frequency different from the first resonant frequency. A power supply for the electromagnetic field generator is operated with a frequency closer to the first resonant frequency for a time and is operated with a frequency closer to the second resonant frequency period for a subsequent time period. By switching between the frequencies at different times, the heating profile can be moved in the substrate.

16 Claims, 9 Drawing Sheets

Related U.S. Application Data a continuation-in-part of application No. 15/495,039, filed on Apr. 24, 2017, now Pat. No. 10,450,915, and a continuation-in-part of application No. 15/343,533, filed on Nov. 4, 2016, now Pat. No. 10,267,193, and a continuation-in-part of application No. 15/279,406, filed on Sep. 28, 2016, now Pat. No. 10,143,967, said application No. 15/495,039 is a continuation-in-part of application No. 14/829,375, filed on Aug. 18, 2015, now Pat. No. 9,657,622, said application No. 15/279,406 is a continuation-in-part of application No. 14/452,800, filed on Aug. 6, 2014, now Pat. No. 9,488,085, said application No. 14/829,375 is a continuation-in-part of application No. 14/452,800, filed on Aug. 6, 2014, now Pat. No. 9,488,085.

(60) Provisional application No. 62/556,343, filed on Sep. 9, 2017, provisional application No. 62/550,652, filed on Aug. 27, 2017, provisional application No. 62/426,261, filed on Nov. 24, 2016, provisional application No. 62/322,719, filed on Apr. 14, 2016, provisional application No. 62/306,885, filed on Mar. 11, 2016, provisional application No. 62/258,071, filed on Nov. 20, 2015, provisional application No. 62/234,166, filed on Sep. 29, 2015, provisional application No. 62/041,053, filed on Aug. 23, 2014, provisional application No. 61/910,067, filed on Nov. 28, 2013, provisional application No. 61/879,211, filed on Sep. 18, 2013.

(51) Int. Cl.
| | | |
|---|---|---|
| H05B 6/36 | (2006.01) | |
| F01N 9/00 | (2006.01) | |
| H05B 6/10 | (2006.01) | |
| B01D 53/92 | (2006.01) | |

(52) U.S. Cl.
CPC ....... *B01D 53/9431* (2013.01); *F01N 3/2013* (2013.01); *F01N 9/00* (2013.01); *H05B 6/108* (2013.01); *H05B 6/365* (2013.01); *B01D 2255/915* (2013.01); *B01D 2258/012* (2013.01); *B01D 2259/814* (2013.01); *F01N 2900/1602* (2013.01)

(58) Field of Classification Search
CPC .... F01N 13/0097; F01N 3/2006; F01N 3/202; H05B 6/02; C04B 40/0218; C04B 2111/0081; B01J 8/0285; B01J 8/067; B01J 8/087; B28B 11/241; B60K 6/448; B60H 1/00392; B60H 1/00428; B60H 1/2215; C01C 3/0233; F23G 2204/203; F23G 7/063

See application file for complete search history.

(56) References Cited

U.S. PATENT DOCUMENTS

| | | | |
|---|---|---|---|
| 2009/0074630 A1* | 3/2009 | Gonze | F01N 3/027 422/174 |
| 2014/0056780 A1* | 2/2014 | Crawford | B28B 11/043 422/311 |
| 2017/0107887 A1* | 4/2017 | Beulertz | G01N 22/02 |
| 2017/0226907 A1* | 8/2017 | Crawford | H05B 6/108 |

* cited by examiner

APPARATUS AND METHOD FOR GASEOUS EMISSIONS TREATMENT USING INDUCTION HEATING WITH MOVABLE HEAT PROFILE

CROSS REFERENCE TO RELATED PATENTS

This application claims priority pursuant to 35 U.S.C. § 119(e) to U.S. provisional application 62/550,652, entitled "Apparatus and method for gaseous emissions treatment using induction heating with movable heat profile", filed Aug. 27, 2017, and U.S. provisional application 62/556,343, entitled "Further apparatus and method for gaseous emissions treatment using induction heating with movable heat profile", filed Sep. 9, 2017.

This application also claims priority pursuant to 35 U.S.C. § 120 as:

a continuation in part of U.S. patent application Ser. No. 15/343,533 filed Nov. 4, 2016, entitled "Emission control system with controlled induction heating and methods for use therewith", pending, which claims priority from U.S. provisional application 62/258,071 filed Nov. 20, 2015, entitled "Emission control system with controlled induction heating and methods for use therewith";

a continuation in part of U.S. patent application Ser. No. 15/495,039, filed Apr. 24, 2017, entitled "Emission control system with induction heating and methods for use therewith", pending, which is a continuation in part of U.S. patent application Ser. No. 14/829,375, filed Aug. 18, 2015, entitled "Catalytic converter system with control and methods for use therewith" and issuing as U.S. Pat. No. 9,657,622 on May 23, 2017, which claims priority from U.S. provisional application 62/041,053, filed Aug. 23, 2014, entitled "Thermally Managed Catalytic Converter Control Protocol", and which also claims priority as a continuation in part from U.S. patent application Ser. No. 14/452,800, entitled "Catalytic converter structures with induction heating", filed Aug. 6, 2014, and issuing as U.S. Pat. No. 9,488,085 on Nov. 8, 2016, which claims priority from U.S. provisional application 61/910,067, entitled "Catalytic converter using field heating of metal component", filed Nov. 28, 2013, and U.S. provisional application 61/879,211, entitled "Catalytic converter employing electrohydrodynamic technology", filed Sep. 19, 2013;

a continuation-in-part of U.S. patent application Ser. No. 15/819,324 filed Nov. 21, 2017, entitled "Emission control system with frequency controlled induction heating and methods for use therewith" which claims priority from U.S. provisional application 62/426,261, filed Nov. 24, 2016, entitled "Tuning induction heating of a gaseous emissions treatment apparatus";

a continuation-in-part of U.S. patent application Ser. No. 15/279,406 filed Sep. 28, 2016, entitled "Catalytic converter structures with directed induction heating" which claims priority from U.S. provisional application 62/234,166, filed Sep. 29, 2015, entitled "Catalytic converter structures with directed induction heating", and claims priority from U.S. provisional application 62/258,071, filed Nov. 20, 2015 entitled "Catalytic converter system with controlled induction heating and methods for use", and claims priority from U.S. provisional application 62/306,885, filed Mar. 11, 2016 entitled "Structures for inductive heating", and claims priority from U.S. provisional application 62/322,719, filed Apr. 14, 2016 entitled "Induction heating structures", and is a continuation-in-part of U.S. patent application Ser. No. 14/452,800, filed Aug. 6, 2014, entitled "Catalytic converter structures with induction heating", and issuing as U.S. Pat. No. 9,488,085 on Nov. 8, 2016, which claims priority from U.S. provisional application 61/879,211, entitled "Catalytic converter employing electrohydrodynamic technology" filed Sep. 18, 2013, and from U.S. Provisional Application 61/910,067, entitled "Catalytic converter using field heating of metal component" filed Nov. 28, 2013.

FIELD OF THE INVENTION

This invention relates to a structures and methods of operation of catalytic converters, particulate filters (PFs) and like structures for treating exhaust gases to reduce harmful pollution and has particular but not exclusive application to reducing pollution from internal combustion engines at start-up and when idling.

BACKGROUND

The U.S. Department of Transportation (DOT) and the U.S. Environmental Protection Agency (EPA) have established U.S. federal rules that set national greenhouse gas emission standards. Beginning with 2012 model year vehicles, automobile manufacturers required that fleet-wide greenhouse gas emissions be reduced by approximately five percent every year. Included in the requirements, for example, the new standards decreed that new passenger cars, light-duty trucks, and medium-duty passenger vehicles had to have an estimated combined average emissions level no greater than 250 grams of carbon dioxide ($CO_2$) per mile in vehicle model year 2016.

Catalytic converters and DPFs are used in internal combustion engines to reduce noxious exhaust emissions arising when fuel is burned as part of the combustion cycle. Significant among such emissions are carbon monoxide and nitric oxide. These gases are dangerous to health but can be converted to less noxious gases by oxidation respectively to carbon dioxide and nitrogen/oxygen. Other noxious gaseous emission products, including unburned hydrocarbons, can also be converted either by oxidation or reduction to less noxious forms. The conversion processes can be effected or accelerated if they are performed at high temperature and in the presence of a suitable catalyst being matched to the particular noxious emission gas that is to be processed and converted to a benign gaseous form. For example, typical catalysts for the conversion of carbon monoxide to carbon dioxide are finely divided platinum and palladium, while a typical catalyst for the conversion of nitric oxide to nitrogen and oxygen is finely divided rhodium.

Catalytic converters and PFs have low efficiency when cold, i.e. the running temperature from ambient air start-up temperature to a temperature of the order of 300 C or "light-off" temperature, being the temperature where the metal catalyst starts to accelerate the pollutant conversion processes previously described. Light-off is often characterized as the temperature at which a 50% reduction in toxic emissions occurs and for gasoline is approximately 300° C. Below light-off temperature, little to no catalytic action takes place. This is therefore the period during a vehicle's daily use during which most of the vehicle's polluting emissions are produced. Getting the catalytic converter or PF hot as quickly as possible is important to reducing cold start emissions.

Copending U.S. patent application Ser. No. 14/452,800 (Catalytic converter structures with induction heating) shows a catalytic converter assembly having a substrate body with a plurality of cells for cell therethrough of exhaust gases. Metal is located at predetermined locations in the substrate body and an electromagnetic field generator is mounted adjacent the substrate body for generating a varying electromagnetic field inductively to heat the metal and so heat the substrate body.

SUMMARY OF THE INVENTION

BRIEF DESCRIPTION OF THE DRAWING

For simplicity and clarity of illustration, elements illustrated in the accompanying figure are not drawn to common scale. For example, the dimensions of some of the elements are exaggerated relative to other elements for clarity. Advantages, features and characteristics of the present invention, as well as methods, operation and functions of related elements of structure, and the combinations of parts and economies of manufacture, will become apparent upon consideration of the following description and claims with reference to the accompanying drawings, all of which form a part of the specification, wherein like reference numerals designate corresponding parts in the various figures, and wherein:

DETAILED DESCRIPTION OF THE INVENTION INCLUDING THE PRESENTLY PREFERRED EMBODIMENTS

Figure 1:
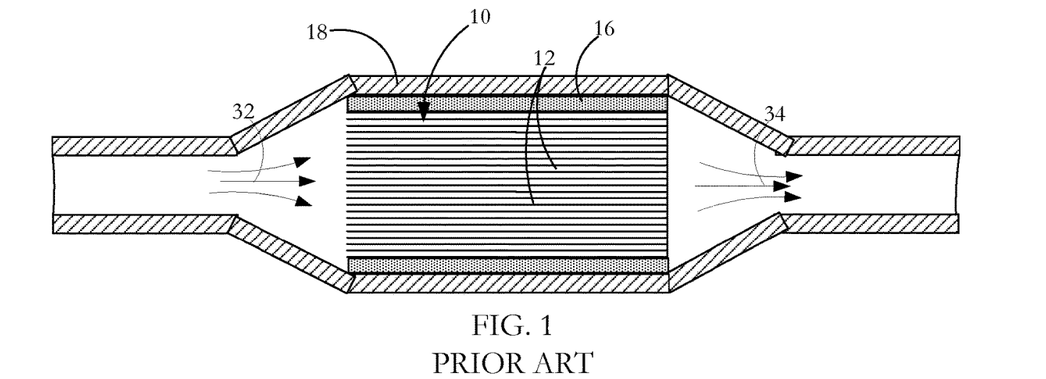
FIG. 1 is a longitudinal sectional view of a prior art gaseous emissions treatment unit.

A gaseous emissions treatment assembly may take any of a number of forms. Typical of these is a catalytic converter having a cylindrical substrate body 10 usually made of ceramic material and often called a brick, an example of which is shown in FIG. 1. The brick has a honeycomb structure in which a number of small area passages or cells 12 extend the length of the brick, the cells being separated by walls 14. There are typically from 400 to 900 cells per square inch (cpsi) of cross-sectional area of the substrate body 10 and the walls are typically in the range 0.003 to 0.008 inches in thickness. Typically, the ceramic substrate body 10 is formed in an extrusion process in which green ceramic material—containing clay or a mix of clay and particulate ceramic—is extruded through an appropriately shaped die and units are cut successively from the extrusion. The units are fired to convert the clay component to ceramic, the units being then cut into bricks. The areal shape of the cells or passages 12 may be whatever is convenient for contributing to the overall strength of the substrate body 10 while presenting a large contact area at which flowing exhaust gases can interact with a hot catalyst coating the interior walls of the cells. In other gaseous emissions treatment such as particulate filters, there may or may not be catalyst coating on the passage walls. In particulate filters, a checkerboard subset of cells have their front ends plugged, a 'reverse' checkerboard subset of cells have their back ends plugged, and gaseous emissions are treated by being driven though porous walls of the honeycomb structure from cells of the first subset into cells of the reverse subset.

In the catalytic converter, interiors of the tubular cells 12 are wash-coated with a layer containing a particular catalyst material. A wash-coat typically contains a base material, suitable for ensuring adherence to the cured ceramic material of the substrate body, and entrained particulate catalyst material for promoting specific pollution-reducing chemical reactions. Examples of such catalyst materials are platinum and palladium which are catalysts effective in converting carbon monoxide and oxygen to carbon dioxide, and rhodium which is a catalyst suitable for converting nitric oxide to nitrogen and oxygen. Other catalysts are known which promote high temperature oxidation or reduction of other gaseous materials. The wash-coating is prepared by generating a suspension of the finely divided catalyst in a ceramic paste or slurry, the ceramic slurry serving to cause the wash-coat layer to adhere to the walls of the ceramic substrate body. As an alternative to wash-coating to place catalyst materials on the substrate body surfaces, the substrate body material itself may contain a catalyst so that the brick presents catalyst material at the internal surfaces bounding the cells.

Exhaust gases from diesel (compression combustion) engines contain more nitrogen oxides than gasoline (spark combustion) engines. Long-term exposure to nitrogen oxides even at low levels can cause temporary or permanent respiratory problems. Selective catalytic reduction (SCR) is a method by which a liquid reductant is injected into a diesel engine exhaust flow to combine with nitrogen dioxide and nitric oxide (referred to collectively as $NO_x$) in the exhaust gas. A preferred reductant is aqueous urea $(2(NH_2)_2CO$ which is often referred to as diesel exhaust fluid (DEF). In the presence of a catalyst, ammonia resulting from thermal decomposition of the urea combines with the nitrogen oxides to produce less harmful products, chiefly nitrogen and water. Other reductants such as anhydrous ammonia and aqueous ammonia may also be used as an alternative to urea although especially for automotive application, on-board storage presents greater difficulty. Suitable catalysts may be any of certain metals oxides (such as those of molybdenum, vanadium, and tungsten), certain precious metals and zeolites. The typical temperature range for a SCR reaction is from 360° C. to 450° C. with a catalyst such as activated carbon being used to stimulate lower temperature reactions. As in gasoline (spark combustion engines), diesel (pressure combustion) engines may experience a period after a start-up where the exhaust temperature is too cool for effective SCR $NO_x$ reduction processes to take place. Other catalytic converters in which the present invention finds application for preheating or supplementary heating are lean NOX catalyst systems, lean NOX trap systems and non-selective catalytic reduction systems. The present invention is applicable also to each of these nitrogen oxide emissions treatment assemblies.

A gaseous emissions treatment assembly may have a series of the substrate bodies or bricks 10, each having a particular catalyst layer or emissions treatment mode depending on the noxious emission to be reduced or neutralized. Gaseous emissions treatment bricks may be made of materials other than fired ceramic, such as stainless steel. Also, they may have different forms of honeycombed cells or passages than those described above. For example, cells can be round, square, hexagonal, triangular or other convenient cross-sectional shape. In addition, if desired for optimizing strength and low thermal capacity or for other purposes, some of the extruded honeycomb walls can be formed so as to be thicker than other of the walls or formed so that there is some variety in the shape and size of cells. Junctions between adjacent interior cell walls can be sharp angled or can present curved profiles.

Typically, as shown in FIG. 1, the wash-coated ceramic honeycomb brick 10 is wrapped in a ceramic fibrous expansion blanket 16. A sheet metal casing or can 18 transitions between the parts of an exhaust pipe (not shown) fore and aft of the gaseous emissions treatment component so as to encompass the blanket wrapped brick. The casing 18 is typically made up of two parts which are welded to seal the brick in place. The expansion blanket 16 provides a buffer between the casing 18 and the brick 10 to accommodate their dissimilar thermal expansion coefficients. The metal of the sheet metal casing 18 expands much more than the ceramic material of the brick at a given temperature increase and, if the two materials were bonded together or in direct contact with each other, destructive stresses would be experienced at the interface of the two materials. The blanket 16 also dampens vibrations from the exhaust system that might otherwise damage the brittle ceramic of the substrate body 10.

In use, the encased brick (or bricks) is mounted in the vehicle exhaust line to receive exhaust gases from the engine and to pass them to the vehicle tail pipe. Exhaust gases 32 enter the front of the gaseous emissions treatment component 10 and treated exhaust gases 34 exit from its rear. In the course of passing along the cells, the exhaust gases the ceramic brick 10 and the catalyst coating is heated to promote treatment processes where the flowing gases contact the catalyst layer. Especially when the vehicle engine is being run at optimal operating temperature and when there is substantial throughput of exhaust gases, such treatment components operate substantially to reduce the presence of noxious gaseous emissions entering the atmosphere. Such components have shortcomings however at start-up when the interior of the brick is at low temperature, during idling during city driving or when waiting for a coffee at a Tim Hortons drive-through, and between electric driving periods for hybrid vehicles.

Brick shape, profile and cell densities vary among different manufacturers. For example, while most bricks are round, some are oval, square or irregular in cross-sectional shape. Some assemblies have single stage bricks that are generally heavily wash-coated with the catalyst metals, while others may have two or three bricks with different wash-coatings on each brick. Some exhausts have 900, 600 and 400 cpsi cell densities used in the full exhaust assembly, while others use only 400 cpsi bricks throughout. A close-coupled converter may be mounted up close to the exhaust manifold with a view to reducing the period between start-up and light-off temperature. An underfloor converter can be located further from the engine where it will take relatively longer to heat up but be relatively larger and used to treat the majority of gases once the exhaust assembly is up to temperature. In another configuration, a component for reducing the period to light-off temperature and a component to deal with high gas flow after light-off are mounted together in a common casing.

At one or more locations in the assembly, sensors mounted in the exhaust gas flow including within or adjacent the substrate body provide feedback to the engine control system for emission checking and tuning purposes. Aside from start-up, control of fuel and air input has the object typically of maintaining a 14.6:1 air:fuel ratio for an optimal combination of power and cleanliness. A ratio higher than this produces a lean condition—not enough fuel. A lower ratio produces a rich condition—too much fuel. The start-up procedure on some vehicles runs rich for an initial few seconds to get heat into the engine and ultimately the catalytic converter. The structures and operating methods described below for indirectly heating the catalyst layers and the exhaust gases can be used with each of a close-coupled catalytic converter, an underfloor converter, and a combination of the two. Outputs from the temperature sensors are taken to a controller at which the monitored temperature or temperatures are used to control when induction heating is switched on and off. Using an appropriate algorithm implemented at the controller, the monitored temperatures may also be used to control specific effects of the applied heating processes to achieve a particular heating pattern.

Figure 2:
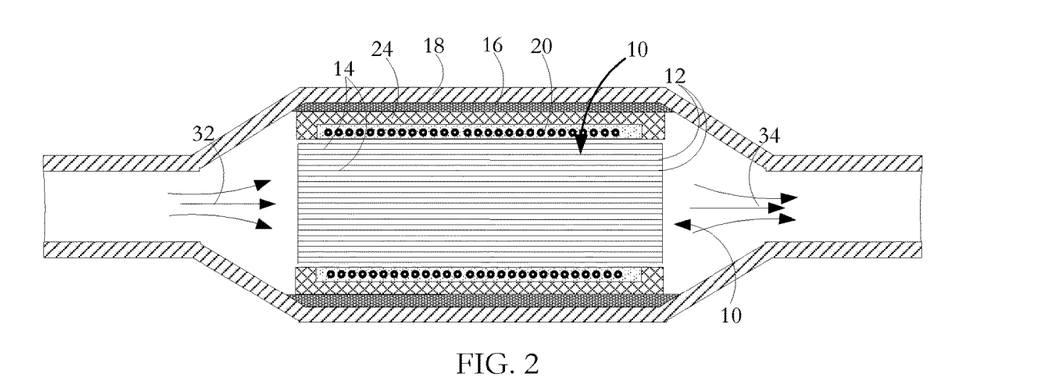
FIG. 2 is a longitudinal sectional view of a gaseous emissions treatment unit adapted for use in an embodiment of the invention.
Figure 3:
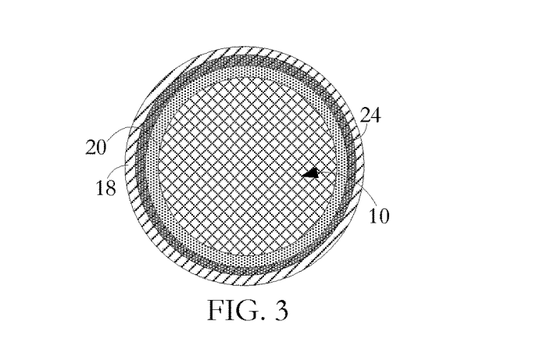
FIG. 3 is a cross-sectional view of the unit of FIG. 2.

As disclosed in U.S. Pat. No. 9,488,085, a gaseous emissions treatment assembly such as that shown in FIG. 1 is modified as shown in FIGS. 2 and 3 to enable induction heating. Induction heating is a process in which a metal body is heated by applying a varying electromagnetic field so as to change the magnetic field to which the metal body is subject. This, in turn, induces eddy currents within the body, thereby causing resistive heating of the body. In the case of a ferromagnetic metal body, heat is also generated by a hysteresis effect. When the non-magnetized ferromagnetic metal is placed into a magnetic field, the metal becomes magnetized with the creation of magnetic domains having opposite poles. The varying field periodically initiates pole reversal in the magnetic domains, the reversals in response to high frequency induction field variation on the order of 1,000 s to 1,000,000 s cycles per second (Hz) depending on the material, mass, and shape of the ferromagnetic metal body. Magnetic domain polarity is not easily reversed and the resistance to reversal causes further heat generation in the metal.

As illustrated in FIGS. 2 and 3, surrounding the ceramic substrate body 10 is a metal coil 20 and, although not visible in FIG. 2, located within selected ones of the cells 12 are metal elements 22 (FIG. 4) such as wires. By generating a varying electromagnetic field at the coil 20, a chain reaction is initiated, the end result of which is that after start-up of a vehicle equipped with an exhaust system embodying the invention, light-off temperature may be attained more quickly in the presence of the varying electromagnetic induction field than if there were no such field. The chain reaction is as follows: the varying electromagnetic field induces eddy currents in the metal elements 22; the eddy currents cause heating of the metal elements; heat from the metal elements 22 is transferred to the ceramic substrate body 10; heat from the heated substrate body 10 is transferred to exhaust gas as it passes through the emissions control component; and the heated exhaust gas causes exothermic catalytic reactions to be initiated more quickly at the walls 14 compared to the period to initiation by exhaust gas having only heating from operation of the vehicle engine. Conduction from the heated metal elements 22 is the primary source of heat transfer to the ceramic substrate 10 and therefore to the exhaust gases when the emissions component is in operation. There is also a small amount of convective and radiated heat transfer at any small air gaps between metal elements such as wires and the interior surface of the cells within which they are contained.

The coil 20 is a wound length of copper tube, although other materials such as copper wire or litz wire may be used. Copper tube is preferred because it offers high surface area in terms of other dimensions of the coil; induction being a skin-effect phenomenon, high surface area is of advantage in generating the varying field. If litz wire or copper wire is used, an enamel or other coating on the wire is configured not to burn off during sustained high temperature operation of the converter. An air gap between the coil 20 and the nearest inductance metal elements 22 prevents significant heat transfer from the metal elements 22 to the coil 10 which would otherwise increase the coil resistivity and so lower its efficiency.

A layer 24 of electromagnetic field shielding/concentrating material is located immediately outside the coil 20 to provide induction shielding and to reduce induction loss to the metal converter housing. The layer 24 also acts to increase inductive coupling to the metal in the substrate body 10 to focus heating. The shield/concentrator 24 can be made from a ferrite or other high-permeability, low-power-loss materials such as Giron, MagnetShield, Papershield, Finemet, CobalTex, or other magnetic shielding material that can be arranged to surround some or all of the windings of the coil 20. In particular, the magnetic shield 24 operates as a magnetic flux concentrator, flux intensifier, diverter, or flux controller to contain the magnetic fields within the substrate body. The magnetic shield lowers loss by mitigating undesirable heating of adjacent conductive materials. Without the magnetic shield/concentrator 24, magnetic flux produced by the coil 20 could spread around the coil 20 and link with the electrically conductive surroundings such as the metal casing 18 and other surrounding metal in an exhaust system, and/or other components of an internal combustion engine, vehicle, generator or other electrical system or host system, decreasing the life of these components and increasing energy loss. In addition, the layer 24 operates to direct or concentrate the magnetic field to the substrate body 10 providing selective or enhanced heating of a desired region of the substrate body 10, for example, by redirecting magnetic flux that would otherwise travel away from that desired region. In particular, the layer 24 operates to concentrate the magnetic flux produced by the coil 20 in the direction of the metal elements 22 in the substrate body 10 for more efficient heating. As an additional benefit, the magnetic shield can improve the electrical efficiency of the induction coil 20 by increasing power transfer.

The coil is contained in a fiber insulation sheath 26 with the sheathed coil being encased in a in cast, cured insulation. The sheath functions both to stabilize the coil position and to create an air-tight seal to confine passage of the exhaust gases through the ceramic honeycomb substrate body 10 where catalytic action takes place. The insulation also provides a barrier to prevent the induction coil 20 from shorting on the converter can 18 or the ferrite shield 24. The insulation is suitably alumino-silicate mastic. Alternatively, the substrate body can be wrapped in an alumino-silicate fiber paper. In one manufacturing method, the copper coil 20 is wrapped around the substrate body and then placed in the casing or can 18. In an alternative manufacturing method, the coil 20 is placed in the can or casing 18 and the substrate body 10 is inserted into the coil/can assembly.

A varying electromagnetic induction field is generated at the coil by applying power from either a DC or AC source. Conventional automobiles have 12 VDC electrical systems. The induction system can operate on either DC or AC power supply. The induction signal produced can also be either DC or AC driven. For either DC or AC, this produces a frequency of 1 to 200 kHz, a RMS voltage of 130 to 200V and amperage of 5 to 8 A using 1 kw of power as an example. In one example suitable for road vehicles, a DC to DC bus converts the vehicle's 12 VDC battery power to the required DC voltage outlined above. In another example suitable for conventional road vehicles, a DC to AC inverter converts the vehicle's 12V DC battery power to the desired AC voltage outlined above. Another example is more suited to hybrid vehicles having both internal combustion engines and electric motors have on-board batteries rated in the order of 360V voltage and 50 kW power. In this case, the battery supply power is higher, but the same basic DC to DC bus or DC to AC inverter electrical configuration can be applied. An insulated gate bipolar transistor (IGBT) or metal-oxide-semiconductor field effect transistor (MOSFET) high speed switch is used to change the direction of electrical flow through the coil. In terms of the effect of a varying electromagnetic induction field on metal in the ceramic substrate body, a low switching frequency produces a longer waveform providing good field penetration below the surface of the metal element and therefore relatively uniform heating. However, this is at the sacrifice of high temperature and rapid heating owing to the lack of switching. In contrast, a high switching frequency produces a shorter waveform, which generates higher surface temperature at the sacrifice of penetration depth. Applied power is limited to avoid the risk of melting the metal elements or having them reach Curie point. A suitable power input to a single brick coil is of the order of 1.1 kw, although more than 10 kW is possible.

Figure 4:
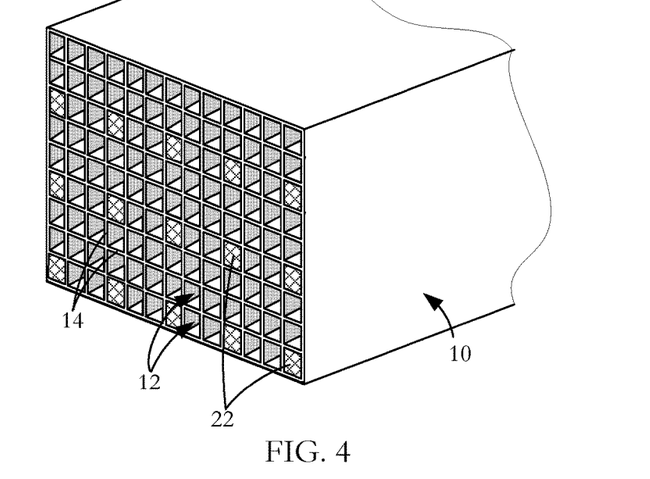
FIG. 4 is a perspective sectional view of a part of a gaseous emissions treatment unit according showing metal elements located in cells of a substrate body.

As previously described, elements 22 made of ferromagnetic or other metal are located at selected locations of the ceramic substrate body 10 as shown in the detail view of FIG. 4. Field produced by the electromagnetic induction coil or other electromagnetic field generator can be tuned to the metal load to achieve high efficiency in terms of generating heat and reduced time to light-off temperature. Heating effects can be modified by appropriate selection of any or all of (a) the electrical input waveform to the coil 20, (b) nature and position of passive flux control elements such as the shield/concentrator 24, and (c) nature, position, and configuration of the coil 20. In addition, the applied field can be changed with time so that there is interdependence between the induction field/heating pattern and the particular operational phase; for example, pre-start-up, warm-up, highway driving, idling and for hybrids, intermittent change over from internal combustion to electric drive. In an alternative configuration, more than one coil can be used to obtain desired induction effects.

The heating pattern is also influenced by the location and configuration of the metal elements 22. A suitable metal for the metal elements is a ferromagnetic metal such as stainless steel grade 430 which has high magnetic permeability and corrosion resistance. Lower permeability alloys such as 300 or 400 series stainless steels may also be used. Alternative metals can be used depending on particular properties required. For shaping the direction and strength of magnetic flux in the substrate, lower magnetic permeability metals or alloys may be used for the metal elements in the outer cells with relatively higher magnetic permeability metals being used for metal elements in the inner cells. Metals having very high magnetic permeability may also be used. For example, Kanthal iron-chrome-aluminum alloy stock manufactured by Sandvik has a relative permeability of 9000 and greater. High relative permeability can be achieved using stock made of other alloys including nickel-iron and iron-cobalt alloys.

There are instances where it is desirable to move or reconfigure the heating profile within a ceramic substrate body of an inductively heated emissions gas treatment assembly. These instances include, but are not limited to, the following:

1. Interior walls of cells or passages formed in the substrate are coated with two or more distinct wash-coats. The wash-coat layers may for example have different entrained catalysts. One wash-coat layer may have one specific activation temperature or other property with another wash-coat layer having a different activation temperature or other temperature-related or heating-related property. The multiple wash-coats may be applied in series along the length of the substrate body, applied front to back, depth-wise inside to outside, or some combination thereof.
2. Maintaining catalyst activation (light-off) temperature, where the ability to move or refocus heating enables the catalyst at at least a small region of the ceramic to be maintained at or above the activation (or light-off) temperature. The purpose is somewhat similar to having a glowing ember in a fire which can easily be restored to a full blaze with the addition of oxygen and fuel because there is already a spark.
3. Achieving a desired exhaust gas temperature profile to heat a downstream after-treatment system. For example, a diesel oxidation catalyst (DOC) may be use to heat a downstream selective catalytic reduction (SCR) system. From a cold start, it is desirable to heat the DOC unit as quickly as possible to the light-off temperature by heating from the front of the DOC and having the heat dragged through the DOC which maintains the heat for as long as possible in the DOC. Once activated, the DOC frontal heating is not required and so heating can be shifted downstream towards the back of the substrate. At the back, very little heat is retained and the maximum amount of heat is transferred to the downstream SCR system, thereby ensuring rapid progress to light-off and good energy management.
4. The elements of an inductively heated emissions gas treatment unit such as that shown in FIG. 4 have limit temperatures at which their operating ability or efficiency is adversely affected. In the case of the pin or wire material, at the Curie temperature of the metal, it may lose its magnetic properties, especially hysteresis. Loss of hysteresis may change the unit inductance which in turn lowers the efficiency of energy transfer and the achievable temperature for a given input power. In the case of the catalyst material in the wash coat, the catalyst may lose its catalyzing property at too high a temperature. In the case of the material of the substrate, typically ceramic, it may lose its integrity and be more easily damaged. In all cases, it may be desirable to continue to apply high energy with a view to obtaining rapid heating of the inductively heated unit but without reaching a high temperature at which damage to any of the emissions gas treatment unit elements may occur.

In a system such as that illustrated in FIG. 4, maximum power is transferred to the emissions gas treatment assembly at the system resonant frequency. As the power supply frequency is increased above the resonant frequency, the power transferred drops; and, similarly, if the frequency is reduced below the resonant frequency. Power transferred into the gaseous emissions treatment substrate can be controlled by adjusting the power supply frequency. The resonant frequency of the system is given by:

$$F_{RES} = \frac{1}{2\pi\sqrt{2LC}} \quad (1)$$

Where: $F_{RES}$ is the resonant frequency of the system (Hz).
L is the system inductance.
C is the system capacitance.

The resonant circuit includes inductance (L), resistance (R), and capacitance (C), the inductance and resistance being heavily material dependent. The capacitance is relatively fixed by the choice of capacitor and, for the FIG. 4 system, is generally independent of the material composition of the wires or pins. Inductance is partly a function of the induction coil with its number of turns, coil shape and size. The resistance has only a small contribution from the coil. Other factors influencing the system resonant frequency are input voltage and current, and external influences such as the surrounding sheet metal. Many of the influencing factors are common regardless of the material composition of the pins or wires within the selected cells.

However, the resonant frequency value depends on the nature of the pin material, with a higher magnetic permeability material resulting in a higher inductance. Further, the majority of the resistance value is contributed by the pin material with a higher resistivity material resulting in a higher resistance value. Overall, the pin material, which has an inherent or natural resonant frequency based on its structure, mass and other factors, is a significant determinant of the system resonant frequency.

In an embodiment of the invention, the material of one set of the metal elements 22 has a relatively low natural resonant frequency and the material of another set of the metal elements 22 has a relatively high natural resonant frequency. With other elements of the emissions gas treatment assembly being substantially fixed, the presence of the two dissimilar materials of elements 22 is a primary determinant of the system resonant frequency. With the two different materials, the system resonant frequency is part way between the system resonant frequency with the one material and the system resonant frequency with the other material. The point at which the resonant frequency falls depends on the mass and distribution of the two materials. Perfect symmetry in terms of mass and distribution between the two materials results in an intermediate resonant frequency that is at or close to the average of the low and high system resonant frequencies. The intermediate frequency can be weighted towards one end of the frequency spectrum range if asymmetry is introduced. The two (or more) materials of elements 22 are selected so that a relatively lower electrical supply frequency causes a majority of the heating energy input to be absorbed in one material (#1) and a relatively higher supply frequency causes a majority of the heating energy input to be absorbed in the other material (#2).

Figure 5:
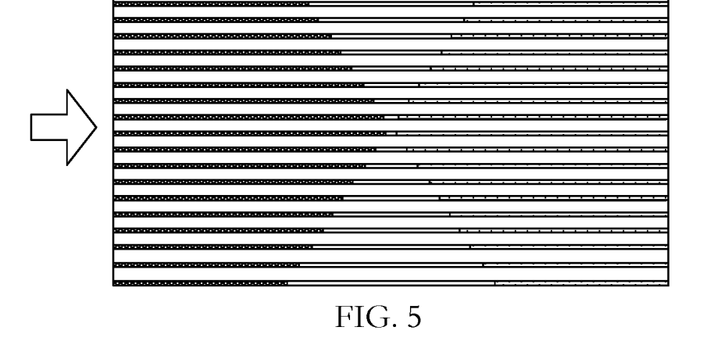
FIG. 5 shows a longitudinal section of a substrate according to an embodiment of the invention suitable for use in a gaseous emissions treatment unit of the form shown in FIG. 1, the substrate stacked with metal in a manner permitting moving of heat profile based on selection of energizing frequency.
Figure 6:
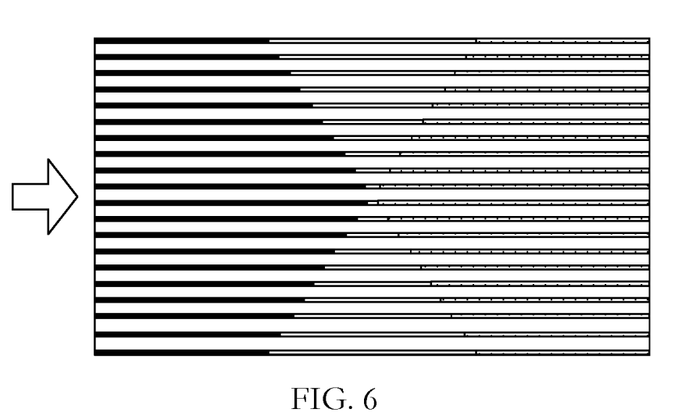
FIG. 6 shows the substrate of FIG. 5 when subject to relatively low frequency induction heating.
Figure 7:
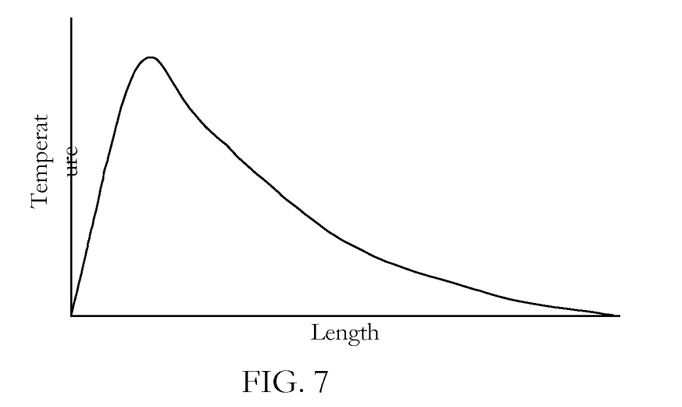
FIG. 7 shows a heat profile along the substrate when the metal elements within selected cells are subjected to relatively low frequency induction heating.
Figure 8:
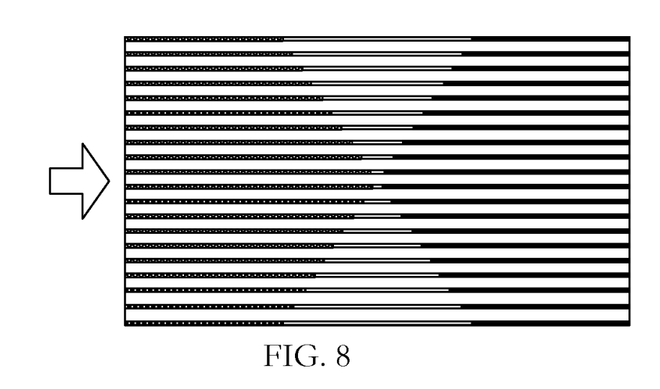
FIG. 8 shows the substrate of FIG. 5 when subject to relatively high frequency induction heating.
Figure 9:
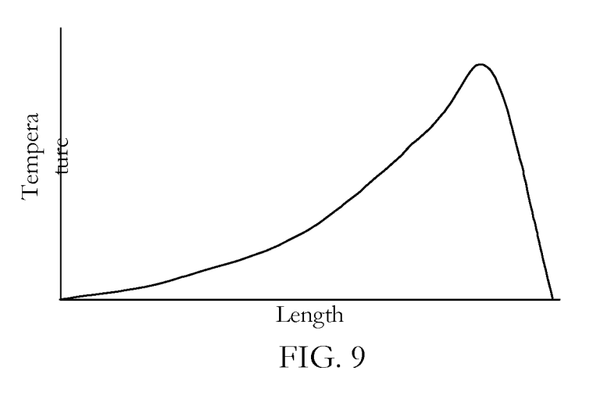
FIG. 9 shows a heat profile along the substrate when the metal elements within selected cells are subjected to relatively high frequency induction heating.
Figure 10:
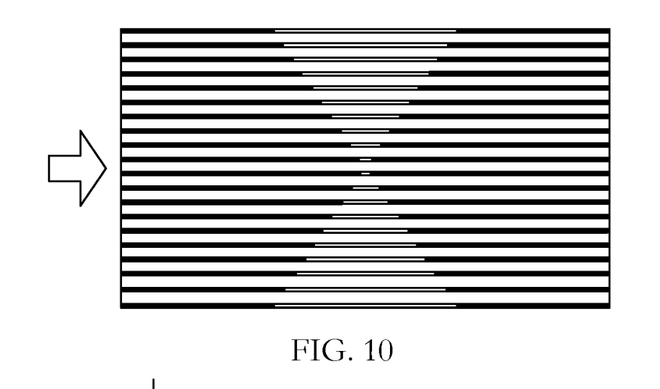
FIG. 10 shows the substrate of FIG. 5 when subject to intermediate frequency induction heating.
Figure 11:
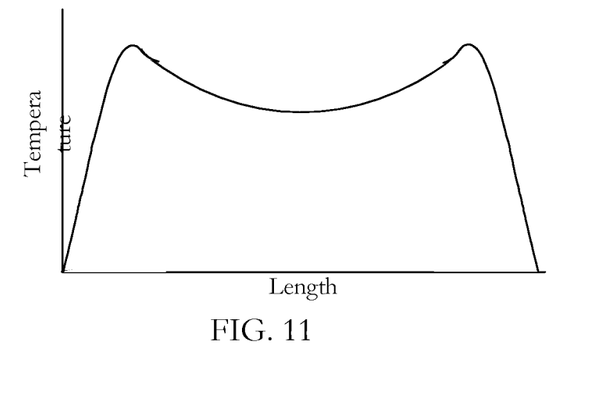
FIG. 11 shows a heat profile along the substrate when the metal elements within selected cells are subjected to intermediate frequency induction heating.

In one configuration as shown in FIGS. 5 to 11, a structure is illustrated suitable for reconfiguring the heating profile along the length of the substrate by appropriate input frequency selection or change. Pins, wires or other metal elements 36 made of a first material (#1) having a relatively low natural resonant frequency are located in selected cells 12 in the left hand part of the substrate 10 and elements 38 made of a second material (#2) having a relatively high natural resonant frequency are located in the selected cells 12 in the right hand part of the substrate. In the example shown, the pins 36, 38 have increasing length towards the center of the substrate 10 to avoid induction 'shadowing'. FIG. 5 shows the substrate with no induction heating is applied and the exhaust gas 32 traveling through other cells 12 of the unit from left to right. FIG. 6 shows the FIG. 5 unit with relatively low frequency inductive heating input applied and FIG. 7 shows the resulting heat profile. FIG. 8 shows the unit with relatively high frequency inductive heating input applied and FIG. 9 shows the resulting heat profile. FIG. 10 shows the unit with an applied input frequency intermediate the relatively low frequency and the relatively high frequency and FIG. 11 shows the resulting heat profile. Although FIG. 5 shows the metal pins 36, 38 having lengths extending to respective ends of substrate 10 and arranged in terms of length and position to present a V shaped profile, the arrangement can be adjusted provided the material #1 inductive heating elements are predominantly located towards one end of the substrate body and the material #2 inductive heating elements are predominantly located towards the other end of the substrate 10. With appropriate adjustment, more than two materials having mutually different natural resonant frequencies can be used, each of the materials influencing the overall system resonant frequency and, depending on their distribution along the substrate, offering the means for changing the heating profile by judicious and time-varied selection of the supply frequency.

In a variation of the FIG. 5 structure, a metal element having a varied composition along its length is accommodated by a particular cell. For example, the composition can have a material #1 composition towards one end of the element and a material #2 composition towards the other end of the element. Alternatively, the composition can include more than two phases and/or more than two materials along the length of the element. Further, the material composition profile along one element can differ from the material composition profile along another element.

Figure 12:
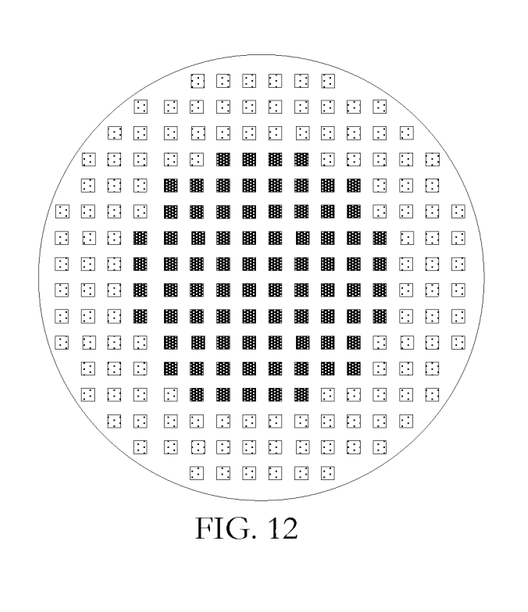
FIG. 12 shows a cross-section of a substrate according to an embodiment of the invention suitable for use in a gaseous emissions treatment unit of the form shown in FIG. 1, the substrate stacked with different inner and outer metal elements in a manner permitting moving of heat profile based on selection of energizing frequency.
Figure 13:
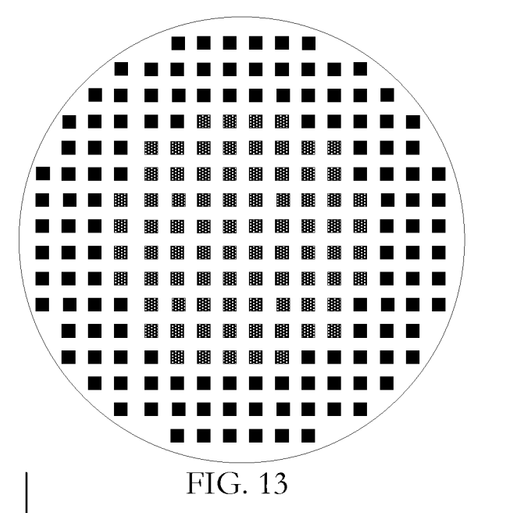
FIG. 13 shows the substrate of FIG. 12 when the metal elements within selected cells are subject to relatively low frequency induction heating.
Figure 14:
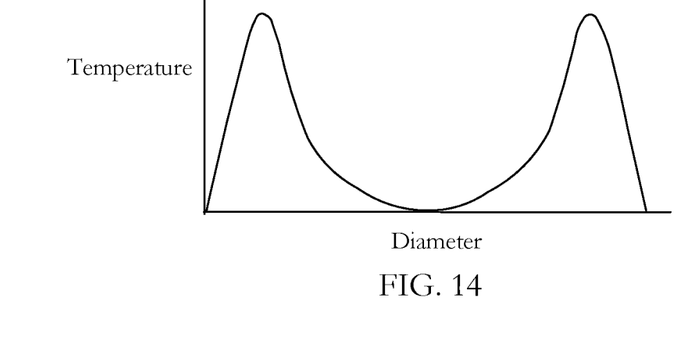
FIG. 14 shows a heat profile corresponding to FIG. 13.
Figure 15:
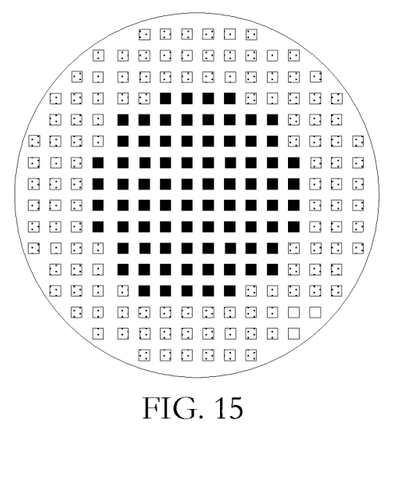
FIG. 15 shows the substrate of FIG. 12 when the metal elements within selected cells are subject to relatively high frequency induction heating.
Figure 16:
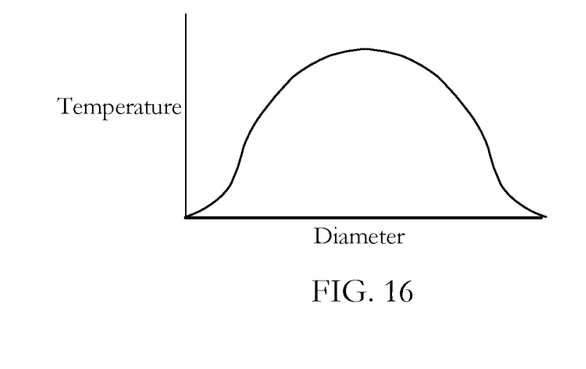
FIG. 16 shows a heat profile corresponding to FIG. 15.
Figure 17:
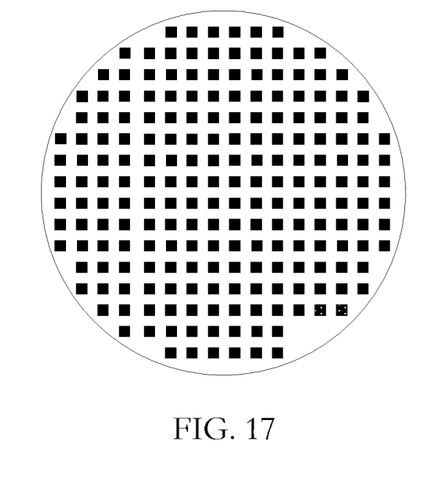
FIG. 17 shows the substrate of FIG. 12 when the metal elements within selected cells are subject to intermediate frequency induction heating.
Figure 18:
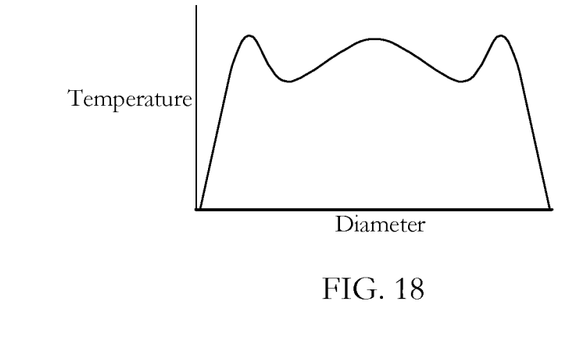
FIG. 18 shows a heat profile corresponding to FIG. 17.

In another configuration as shown in FIGS. 12 to 18, a structure is illustrated suitable for reconfiguring heating profile across the substrate (i.e. inside out) by appropriate input frequency selection. As shown in FIGS. 12, 13, 15 and 17, the unit has pins 40 composed of material #1 having a relatively low natural resonant frequency, located in cells 12 in a radially outer region 42 of the substrate 10. The unit has pins 44 composed of material #2 having a relatively high natural resonant frequency, located in cells 12 in a radially inner region 46 of the substrate. As shown in FIG. 12, no induction heating is applied and the exhaust gas travels through other cells in an 'into the page' direction. FIG. 13 shows the unit with a relatively low frequency inductive heating input applied and FIG. 14 shows the resulting heat profile. FIG. 15 shows the unit with a relatively high frequency inductive heating input applied and FIG. 16 shows the resulting heat profile. FIG. 17 shows the unit with an input frequency intermediate the relatively low frequency and the relatively high frequency and FIG. 18 shows the resulting heat profile. Although FIG. 12 shows the zone of the metal pins 40 having a sharp cut-off from the zone of the metals pins 44, the arrangement can be adjusted provided the material #1 inductive heating elements are predominantly located towards the circumference of the substrate 10 and the material #2 inductive heating elements are predominantly located towards the center of the substrate 10.

Figure 19:
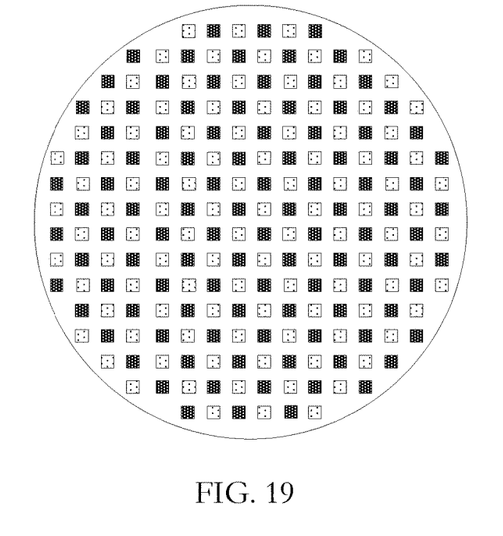
FIG. 19 shows a cross-section of a substrate according to another embodiment of the invention suitable for use in a gaseous emissions treatment unit of the form shown in FIG. 1, the substrate stacked with first and second metal elements in a checkerboard pattern permitting inversion of heating profile based on selection of energizing frequency.
Figure 20:
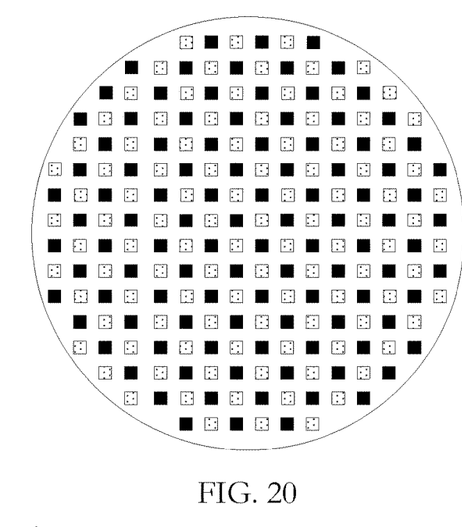
FIG. 20 shows the substrate of FIG. 19 when the metal elements within selected cells are subject to relatively low frequency induction heating.
Figure 21:
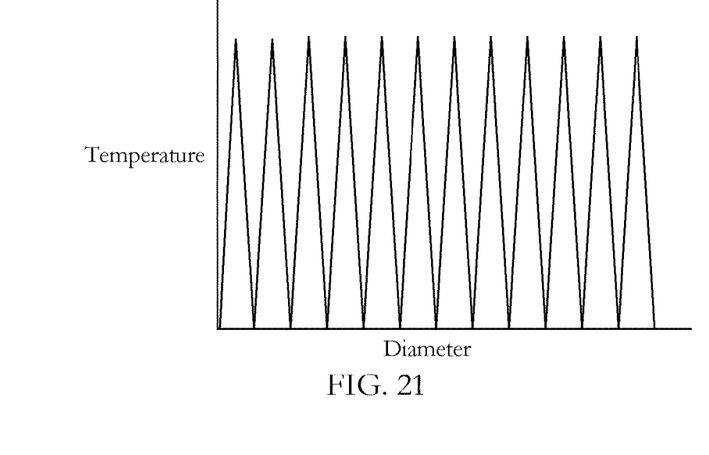
FIG. 21 shows a heat profile corresponding to FIG. 20.
Figure 22:
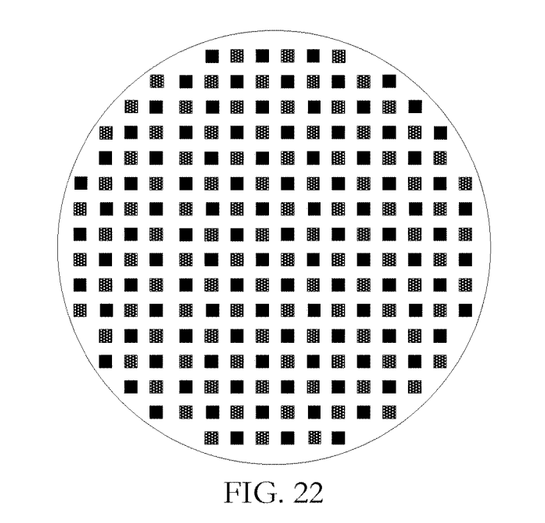
FIG. 22 shows the substrate of FIG. 19 when the metal elements within selected cells are subject to relatively high frequency induction heating.
Figure 23:
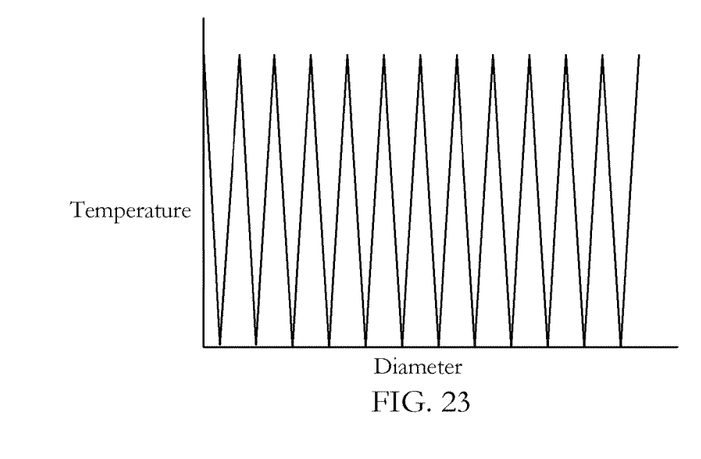
FIG. 23 shows a heat profile corresponding to FIG. 22.
Figure 24:
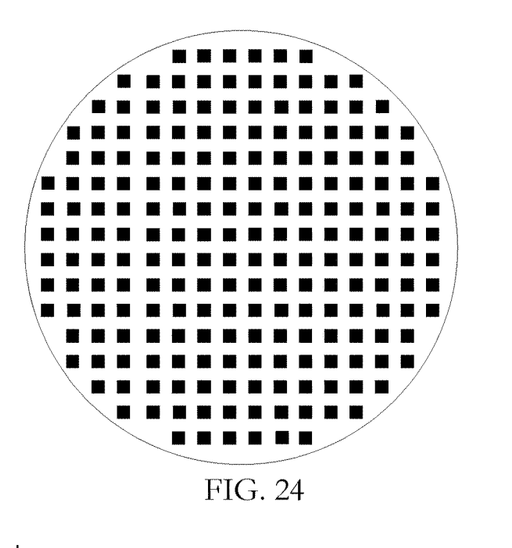
FIG. 24 shows the substrate of FIG. 19 when the metal elements within selected cells are subject to intermediate frequency induction heating.
Figure 25:
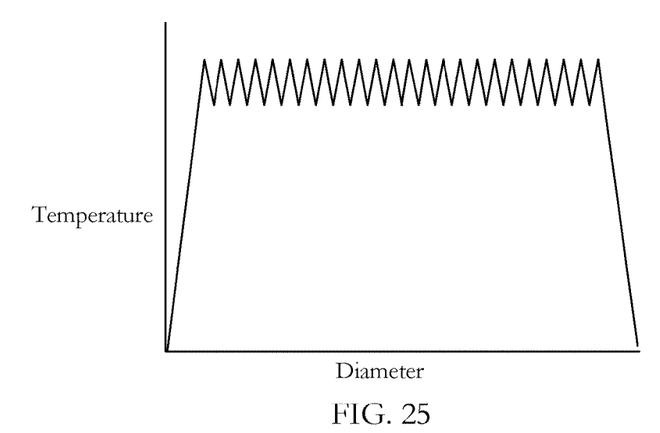
FIG. 25 shows a heat profile corresponding to FIG. 24.

A further configuration particularly suitable for high power Curie point management or high temperature heat management is illustrated by FIGS. 19 to 25. Elements 48 made of the #1 material and elements 50 made of the #2 material are interspersed across the selected cells 12 of the substrate body 10 in a checkerboard pattern. As shown in FIGS. 19, 20, 22, 24, the metal elements 48, 50 are evenly arrayed relative to those cells of the substrate that do not contain inductive heating elements. As shown in FIG. 19, no induction heating is applied and the exhaust gas travels through the other cells in an 'into the page' direction. FIG. 20 shows the unit with the relatively low frequency inductive heating input applied and FIG. 21 shows the resulting saw-tooth heat profile. FIG. 22 shows the unit with the relatively high frequency inductive heating input applied and FIG. 23 shows the resulting saw-tooth heat profile, which is substantially an inversion of the FIG. 21 profile. FIG. 24 shows the unit with an applied input frequency intermediate the relatively low frequency and the relatively high frequency, with FIG. 25 showing the resulting heat profile. As indicated previously, one use of moving the heat profile is to avoid damage to the metal elements occasioned by the elements 48 and/or 50 being heated to their respective Curie points at which magnetic properties are lost. By toggling between the two frequencies, as the pins of material #1 near their Curie point, the input frequency is switched from relatively low to relatively high. Following a period of heating where inductive heating energy is primarily focused on the pins of material #2 and where the material #2 may approach its own Curie point, the input frequency is switched back from relatively high to relatively low frequency. Although FIG. 19 shows the pins 48 and 50 evenly and regularly distributed in the selected cells, the arrangement can be adjusted to provide a less even and/or less regular pattern.

Figure 29:
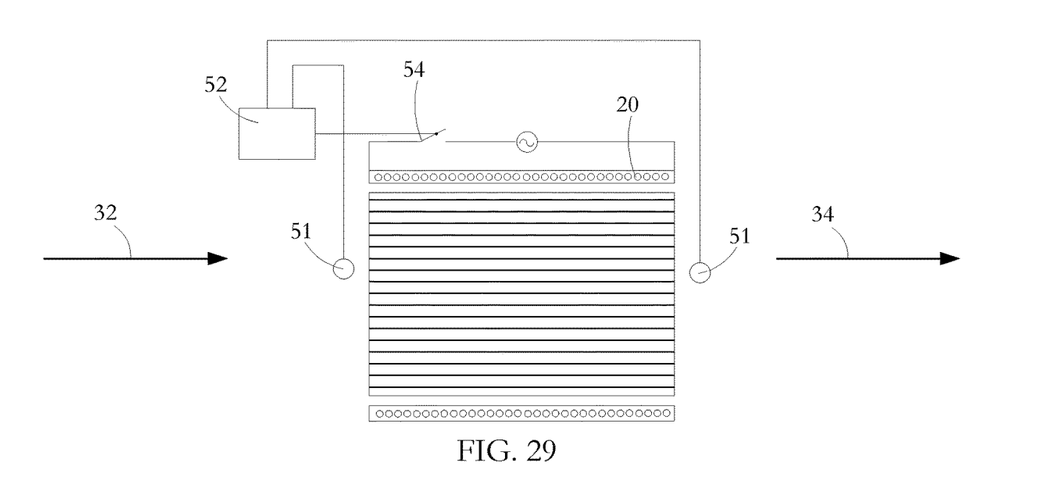
FIG. 29 is a schematic view of a control system according to an embodiment of the invention.

FIG. 29 is a schematic view of an emissions gas treatment system according to an embodiment of the disclosure. The system 75 includes Substrate body 10 having a plurality of cells 12 for the passage of emissions gas 32 that is to be treated. One or more temperature sensors 51 may be located at or near the substrate body 10 to generate temperature signals indicating the temperature at one or more locations, the sensors 51 being implemented via thermocouples or thermistors. Outputs from the sensors 50 are taken to a controller 52 at which the monitored temperature or temperatures are used to control, through switch 54, the periods for which the induction heating supply is held at one frequency to predominantly focus induction heating at one pin material and the periods at which the supply is held at a different frequency to predominantly focus induction heating at another pin material. The controller 52 generates a control signal 58 based at least in part on the compositions of the different pin materials. An electromagnetic field generator including AC source 64 and the coil 20 responds to the control signal 58 by generating an electromagnetic field to inductively heat the substrate body 10. The AC source 64 can, for example, be a variable AC generator that generates an AC signal having a magnitude, duty cycle or power that varies as a function of the control signal 58. In another example, the control signal 58 turns the AC source 64 on and off with a duty cycle that varies as a function, at least in part, of the different materials of the pins located in the selected cells. The AC source is used to generate signals with a frequency at least in part by one or other of the pin materials. Controller 52 can be implemented via a processor such as a standalone processor or a shared processing device such as an engine control module. The controller 52 uses one or more algorithms to control the applied induction process and can be mounted independently of the substrate body 10. For example, the controller 52 can be mounted inside a vehicle where the electronic control circuitry is relatively well protected. Alternatively, with a weatherproof casing, the converter control module can be placed in an engine bay close to the battery or under the vehicle close to the gaseous emissions treatment unit.

Figure 26:
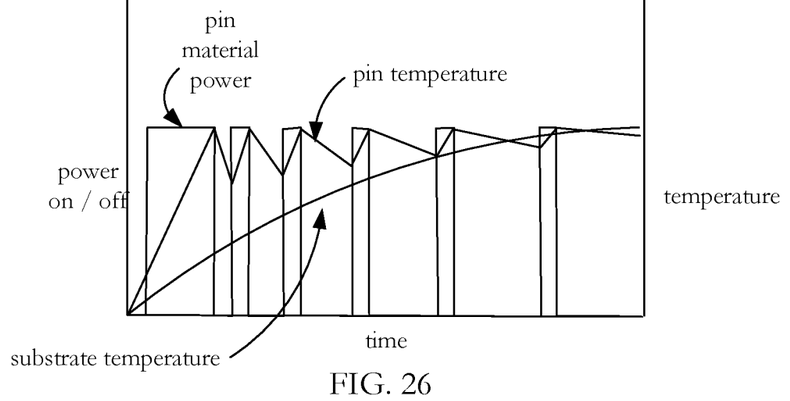
FIG. 26 shows time-related inductive heating for an inductively heated substrate using a single pin material.

The following describes inductive heating of a single pin material unit in comparison with a dual pin material unit. As shown in FIG. 26, with a single pin material unit, power is applied rapidly to heat the pins to a maximum allowable temperature and then the power is turned off to allow time for the part of the substrate ceramic in direct contact with the pins to distribute heat away from the hot pins before the power is turned on again. The ceramic temperature shown in FIG. 26 is the overall average temperature of the ceramic.

Figure 27:
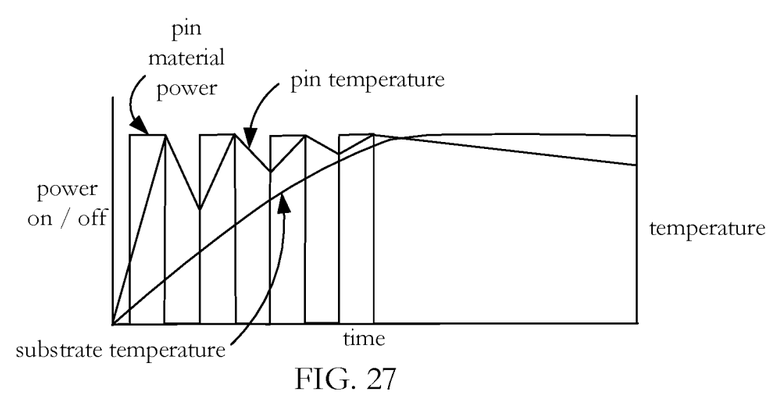
FIG. 27 shows time-related inductive heating of an inductively heated substrate using a dual pin material when subjected to relatively low frequency induction heating.
Figure 28:
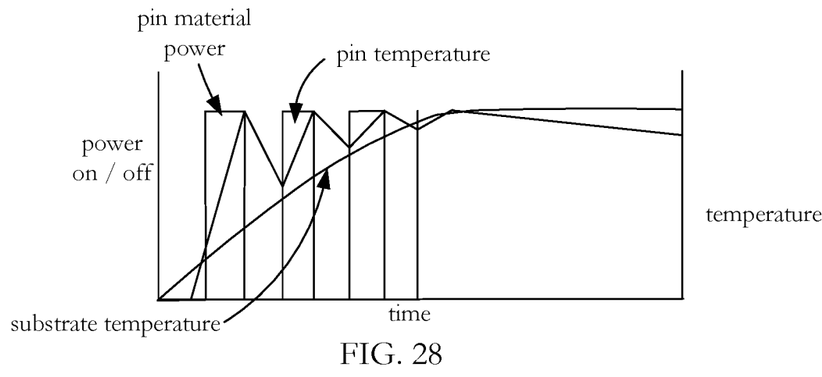
FIG. 28 shows time-related inductive heating for an inductively heated substrate using a dual pin material when subjected to relatively high frequency induction heating.

The two charts FIGS. 27 and 28 for an inductively heated dual pin material unit show low frequency operation for pin material #1 and high frequency operation for pin material #2 as two separate operations, although operation will, in fact, be concurrent as between the two. Again, the ceramic temperature shown is the overall average temperature of the ceramic and is the same for both pin materials and both charts because they share the same ceramic substrate. However, the power duty cycle and pin temperatures are different. The duty cycle for the dual pin material unit is similar to the single pin material unit when focusing on one pin material or the other. However, if the two charts are overlaid on each other, it can be seen that the power supply is never turned-off during the rapid heat-up phase as it alternates between the relatively low frequency and relatively high frequency operation to maximize the heating of each of the two pin materials separately while still maintaining 100% power output. Alternating frequencies back and forth gives the ceramic around each pin composed of one material time to transfer heat away from the source while neighboring pins composed of the other material are heating up. In this respect, it will be understood that all pins are heated to some extent at any time. It is just that focusing of the heating effect is switched back and forth between the two materials.

One effect is that the dual pin material unit can reach the maximum ceramic temperature faster than the single pin material unit as it is able to absorb higher power densities. The heat transfer coefficient of the substrate, such as a cordierite substrate, is a limiting factor for high power heating in single pin material system. The pins can rapidly reach the maximum allowable temperature of the wash coat/ceramic when powered and then the power has to be turned off (or reduced) to allow time for the intense heat in the ceramic around the pins to be transferred to adjacent cells away from the pins. This is a slow process. A dual or multiple pin materials arrangement allows for much more rapid heating through appropriate management of increased power densities. The dual pin materials unit can handle almost double the power density of the single pin material unit resulting in almost half of the heating time to attain the same maximum allowable temperature as the single pin material unit.

Regarding the materials #1 and #2 used in the dual pin material unit, a difference between the material natural resonant frequencies connotes a difference between the properties of the materials contributing to the system inductive heating; i.e., the inductive heating properties of one or both materials must be somewhat compromised compared with an ideal. The best pin materials for heating a single pin material unit are fairly similar: examples are iron (Fe), magnetic stainless (ferritic-FeCr), kanthal (FeCrAl), etc., with iron (Fe) being common and chromium (Cr) a suitable alloy addition. These materials have substantially the same inductive heating performance and it is therefore difficult to tune between any two such materials to move or refocus the heat profile. In fact, for moving heat profile, the materials #1 and #2 should have materially different induction properties. In this respect, non-ferrous metals such as aluminum, copper, brass, etc., or non-metals such as silicon, carbon, graphite, etc., have significantly different performance and can be utilized in conjunction with the 'better' materials in effecting resonant frequency tuning.

In a variation according to another embodiment of the invention, instead of a difference in the composition of the pin material, there is a difference in wire or pin size. In one example, two different diameter pins are used, with the diameter difference being typically 25% or more as between the two sets of pins. In one example, using the same diameter of ceramic substrate, a system was operated at 1 kW with a resonant frequency of 100 kHz using 0.026 inch diameter pins (ideally housed in passages/cells of a 900 cpsi ceramic honeycomb). The system was also operated at 1 kW with a resonant frequency of 100 kHz using 0.036 inch diameter pins (ideally housed in passages/cells of a 400 cpsi ceramic honeycomb). To optimize efficiency, the system can be implemented with two distinct upstream and downstream ceramic substrates with selected cells of one substrate housing pins of one diameter and/or composition and selected cells of the other substrate housing pins of a different diameter and/or composition. In a particular implementation, relatively smaller diameter pins are less closely housed than relatively larger diameter pins in a uniform cell-size substrate. In yet another implementation, the substrate is formed with passages of varied size with the smaller diameter pins housed in cells of relatively smaller cross-section and the larger diameter pins housed in cells of relatively larger cross-section. While the different sized wires have been described in terms of different diameters, in some instances the wires do not have a circular cross-section. For example, square section cells may accommodate substantially square section wires or pins. In such a situation, in distinguishing resonant frequencies, a difference in size of pins selected to establish a difference in resonant frequency is characterized by a difference in dimension(s) other than diameter.

In another embodiment of the invention, a combination of wires is used in which wires of one set are hollow and wires of another set are solid. Whether using pins of different materials or of different cross sectional size or configuration, as an alternative to using a combination of two materials (or pin sizes), three or more different materials (or pin sizes) can be used.

Controlling an applied supply frequency to focus heating at one or other of two or more different pin materials can only ever be an approximate control. In practical terms, when focusing heating at a pin material by applying a particular supply frequency, the supply frequency may be close to but is unlikely to exactly match the resonant frequency of that pin material within the context of the system. In this specification, when referring to selecting a supply frequency to match the resonant frequency having pins of a particular material, it will be appreciated that it may only be an approximate match. When selecting a supply frequency to focus heating at one pin material rather than another pin material, the other pin material will still be heated. However, energy transfer to the other pin material will not be as efficient as energy transfer to the one pin material.

Other variations and modifications will be apparent to those skilled in the art and the embodiments of the invention described and illustrated are not intended to be limiting. The principles of the invention contemplate many alternatives having advantages and properties evident in the exemplary embodiments.

What is claimed is:

1. An assembly for treating gaseous emissions comprising a substrate body having a plurality of cells for the passage of emissions gas to be treated, an elongate inductive heating element contained in each of a first set of the plurality of cells but not in a second set of the plurality of cells, the first set being less in number than the second set, and an electromagnetic field generator mounted adjacent the substrate body for generating a varying electromagnetic field, thereby inductively to heat the inductive heating elements and thereby to heat the substrate body, wherein the inductive heating elements of a first group thereof have a first resonant frequency and the inductive elements of a second group thereof have a second resonant frequency different from the first resonant frequency, the electromagnetic field generator including a controller for generating the varying electromagnetic field at a frequency closer to the first resonant frequency than the second resonant frequency for a first time period and for generating the varying electromagnetic field at a frequency closer to the second resonant frequency than the first resonant frequency for a subsequent second time period.

2. The assembly as claimed in claim 1, wherein the inductive heating elements of the first group are made at least in part of a first material and the inductive heating elements of the second group are made at least in part of a second material different from the first material.

3. The assembly as claimed in claim 1, wherein the inductive heating elements of the first group are of a first size and the inductive heating elements of the second group are of a second size different from the first size.

4. The assembly as claimed in claim 1, wherein the inductive heating elements of the first group are predominantly located towards one end of the substrate body and the inductive heating elements of the second group are predominantly located towards the other end of the substrate body.

5. The assembly as claimed in claim 1, wherein the inductive heating elements of the first group are predominantly located towards a radially outer part of the substrate body and the inductive heating elements of the second group are predominantly located towards a radially inner part of the substrate body.

6. The assembly as claimed in claim 1, wherein the inductive heating elements of the first group are interspersed with the inductive heating elements of the second group across the substrate body.

7. The assembly as claimed in claim 6, wherein the interspersal is a regular checkerboard arrangement of the inductive heating elements of the first group and the inductive heating elements of the second group.

8. The assembly as claimed in claim 2, wherein the first material is or contains one of the group consisting of iron (Fe), chromium (Cr), stainless steel, ferritic (FeCr), kanthal (FeCrAl) and alloys thereof.

9. The assembly as claimed in claim 2, wherein the second material is or contains one of the group consisting of aluminum, copper, brass, silicon, carbon, graphite, or combinations thereof.

10. An assembly for treating gaseous emissions comprising a substrate body having a plurality of cells for the passage of emissions gas to be treated, an elongate inductive heating element contained in each of a first set of the plurality of cells but not in a second set of the plurality of cells, the first set being less in number than the second set, and an electromagnetic field generator mounted adjacent the substrate body for generating a varying electromagnetic field, thereby inductively to heat the inductive heating elements and thereby to heat the substrate body, wherein at least one of the inductive heating elements has a material composition that varies along its length whereby a first part of said inductive heating element has a first resonant frequency and a second part of the elongate inductive heating element has a second resonant frequency different from the first resonant frequency, the electromagnetic field generator including a controller for setting the frequency of the varying electromagnetic field closer to the first resonant frequency than the second resonant frequency for a first time period and for setting the frequency of the varying electromagnetic field closer to the second resonant frequency than the first resonant frequency for a subsequent second time period.

11. A method of treating gaseous emissions using a substrate body having a plurality of cells for the passage of emissions gas, an elongate inductive heating element contained in each of a first set of the plurality of cells but not in a second set of the plurality of cells, the first set being less in number than the second set, and an electromagnetic field generator mounted adjacent the substrate body for generating a varying electromagnetic field, thereby inductively to heat the inductive heating elements and thereby to heat the substrate body, wherein a first group of the inductive heating elements has a first resonant frequency and a second group of the inductive heating elements has a second resonant frequency different from the first resonant frequency, the method comprising setting a frequency of the varying electromagnetic field closer to the first resonant frequency than the second resonant frequency for a first time period and setting the frequency of the varying electromagnetic field closer to the second resonant frequency than the first resonant frequency for a second time period.

12. The method as claimed in claim 11, wherein setting the frequency of the varying electromagnetic field closer to the first resonant frequency than the second resonant frequency for the first time period results in the substrate being heated to a first temperature and setting the frequency of the varying electromagnetic field closer to the second resonant frequency than the first resonant frequency for the second time period results in the substrate being heated to a second temperature different from the first temperature.

13. The method as claimed in claim 11, wherein setting the frequency of the varying electromagnetic field closer to the first resonant frequency than the second resonant frequency for the first time period results in a region of the substrate being maintained at a catalyst light-off temperature.

14. The method as claimed in claim 11, wherein setting the frequency of the varying electromagnetic field closer to the first resonant frequency than the second resonant frequency for the first time period results in a front region of the substrate being heated to a temperature higher than a back region of the substrate and setting the frequency of the varying electromagnetic field closer to the second resonant frequency than the first resonant frequency for the second time period results in a back region of the substrate being heated to a temperature higher than a front region of the substrate.

15. The method as claimed in claim 11, wherein setting the frequency of the varying electromagnetic field closer to the first resonant frequency than the second resonant frequency for the first time period results in the first group of inductive heating elements being heated to a temperature higher than the second group of inductive heating elements and setting the frequency of the varying electromagnetic field closer to the second resonant frequency than the first resonant frequency for the second time period results in the second group of inductive heating elements being heated to a temperature higher than the first group of inductive heating elements.

16. The method as claimed in claim 11, wherein setting the frequency of the varying electromagnetic field closer to the first resonant frequency than the second resonant frequency for the first time period results in the first group of inductive heating elements being heated to a temperature marginally less than the Curie temperature of the material of the inductive heating elements of the first group and setting the frequency of the varying electromagnetic field closer to the second resonant frequency than the first resonant frequency for the second time period results in the second group of inductive heating elements being heated to a temperature marginally less than the Curie temperature of the material of the inductive heating elements of the second group.

* * * * *